United States Patent [19]
Hoffmeyer

[11] 3,942,055
[45] Mar. 2, 1976

[54] HERMETIC MOTOR STATOR

[75] Inventor: William R. Hoffmeyer, Holland, Mich.

[73] Assignee: General Electric Company, Fort Wayne, Ind.

[22] Filed: Oct. 16, 1974

[21] Appl. No.: 515,149

[52] U.S. Cl. ............................ 310/216; 310/184
[51] Int. Cl.² ...................................... H02K 1/00
[58] Field of Search .......... 310/216, 198, 217, 179, 310/176, 180, 177, 184; 193/179, 185, 187, 188, 194, 254, 258, 259, 166; 336/210–213, 216–219, 233, 234; 62/401, 402

[56] References Cited
UNITED STATES PATENTS

| | | | |
|---|---|---|---|
| 1,723,912 | 8/1929 | Bergman | 310/176 |
| 2,795,712 | 6/1957 | Suhr | 310/198 |
| 2,830,209 | 4/1958 | Fleckenstein | 310/216 |
| 3,235,762 | 2/1966 | Brammero | 310/216 |
| 3,433,988 | 3/1969 | Arnold | 310/166 |
| 3,633,056 | 1/1972 | Hoffmeyer | 310/180 |
| 3,774,062 | 11/1973 | Johnson | 310/184 |
| 3,783,318 | 1/1974 | Widstrand | 310/216 |
| R26,179 | 3/1967 | Brammerlo | 310/224 |

Primary Examiner—R. Skudy
Attorney, Agent, or Firm—Ralph E. Krisher, Jr.

[57] ABSTRACT

A stator for a dynamoelectric machine having a primary phase winding arranged in a plurality of winding receiving slots and including at least two coil groups defining at least two predetermined primary magnetic poles. An auxiliary phase winding defining at least two auxiliary magnetic poles angularly displaced from the primary magnetic poles. The at least two predetermined magnetic poles having a polar axis. Each primary phase winding coil group is symmetrical about the polar axis. The first slot each side the axis established by the first phase winding is of a first predetermined size, three slots next adjacent each first slot are of a second predetermined size, and two slots of a third predetermined area are next adjacent to the slots of the second predetermined area. The slots of the third predetermined size are larger than the slots of the second predetermined size and the slots of the second predetermined size are larger than the slots of the first predetermined size.

7 Claims, 8 Drawing Figures

HERMETIC MOTOR STATOR

BACKGROUND OF THE INVENTION

This invention relates generally to dynamoelectric machines and more particularly to an improved stator for use in such machines.

One of the problems in the art of dynamoelectric machine design has been to minimize material and to reduce the amount of labor required in the manufacturing of such machines and yet not sacrifice performance. There are certain design restrictions which must be considered when attempting to reduce the amount of material used in the stator for an electric motor. For instance, in the stator assembly, sufficient iron must be used to minimize saturation by magnetic flux during operation. Also a sufficient amount of wire must be used to provide the desired operating characteristics. If the size of wire is reduced in a given motor, and all other things held constant, current density increases and too much heat may be generated. These problems are particularly hard to solve in small size electric motors because of, among other things, their inherent physical limitations and especially as such limitations relate to manufacturing tolerances.

In the past, stators having particular utility as permanent-split capacitor, or resistance-split phase motors — some with alloy wire auxiliary windings, some with backlash auxiliary winding sections, and some with especially high auxiliary winding current density have been designed. These and other approaches are described in more detail in U.S. Pat. No. 3,774,062 to John H. Johnson and U.S. Pat. No. 3,663,057 to Chester A. Smith and William M. Stoddard, both of which are assigned to the same assignee as the present application.

Extra tooling is often required to make laminations for cores of the same nominal size but that are to be wound to permit their use as motors with different auxiliary winding approaches as mentioned above. Therefore, it would be desirable to provide a fixed design stator lamination or core that could be used with many different i.e., congenerous, auxiliary winding approaches.

In numerous applications, particularly in hermetic motors, a mode of mounting the stator must be considered, such as for example, bolt holes in the stator core. However, such bolt holes represent restrictions to magnetic flux and may result in decreased performance. In small motors bolt holes can cause particularly detrimental flux restrictions. It would be desirable to provide a stator of one design for not only congenerous types of auxiliary winding configurations but also such that different bolt hole patterns may be used, and especially where different patterns would require a different total number of bolt holes.

It is desirable to be able to use less expensive winding material than copper wire, such as aluminum wire, and also to punch laminations for a stator in a manner to minimize the amount of scrap. For instance, in a strip of material wide enough to accommodate one lamination, a lamination having at least two flat sides may be designed to use less material than a round lamination since advantage could be taken of the parallel sides of the strip of material. However, laminations having flatted sides can make solution of other problems mentioned above even more difficult since scarcity of yoke material along the flatted sides may result in less flux carrying capacity.

In view of the foregoing, it should now be understood that it would be desirable to provide a stator that would solve most of the above problems.

Accordingly, one object of the present invention is to provide a motor lamination and/or core structure capable of permanent-split capacitor or capacitor start or capable of resistance-split phase motors using alloy wire auxiliary windings, backlash auxiliary winding sections, or high current density auxiliary windings.

Another object is to provide a stator lamination and/or core for a small size electric motor wherein different mounting hole patterns may be readily provided without necessitating rearrangement and/or sizing of winding accommodating slots.

Yet another object is to provide a stator for a small size electric motor wherein minimum amounts of core material are used and yet wherein at least one of the windings may be of aluminum wire.

SUMMARY OF THE INVENTION

In carrying out the above and other objects of the invention in one form, I provide a stator for a dynamoelectric machine comprising a plurality of laminations each having a plurality of angularly spaced apart, coil accommodating slots. In an illustrated embodiment, a primary phase winding is arranged in distributed fashion in a plurality of the slots. The winding includes at least two coil groups each defining a primary magnetic pole. A distributed auxiliary phase winding defines at least two auxiliary magnetic poles which are angularly displaced from the primary magnetic poles. The primary magnetic poles have a primary polar axis. Each primary phase winding coil group is symmetrical about the primary polar axis. The first slot on each side of the primary polar axis is of a first predetermined area. Three slots which are next adjacent each of the first slots are of a second predetermined area. Two slots of a third predetermined area are next adjacent to the slots of the second predetermined area. The slots of the third predetermined area are larger than the slots of the second predetermined area and the slots of the second predetermined area are larger than the slots of the first predetermined area.

The subject matter which I regard as my invention is set forth in the appended claims. The invention itself, however, together with further objects and advantages thereof may be better understood by referring to the following more detailed description taken in conjunction with the accompanying drawings.

DESCRIPTION OF THE PREFERRED EMBODIMENT

Figure 1:
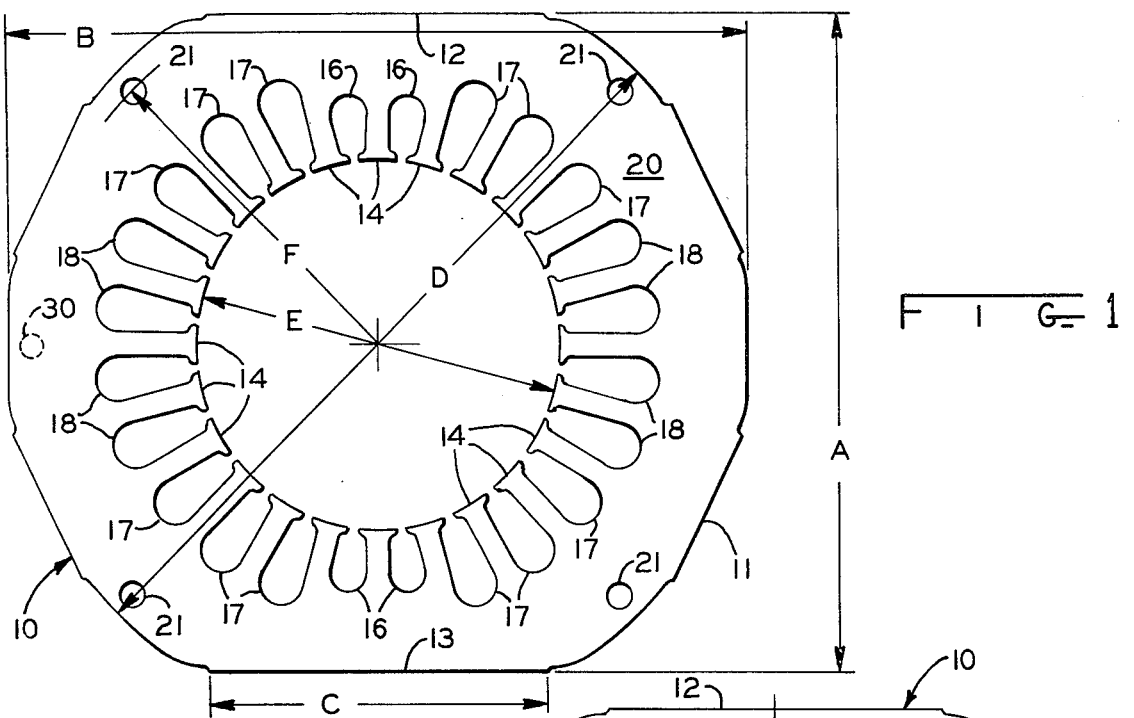
FIG. 1 is a plan view of a stator core embodying my invention in one form.

Referring now to the drawings, FIG. 1 shows a stator core 10 which is suitable for use in a compressor of a refrigerator or air conditioning unit or in any other application where space is limited and yet where relatively high performance is needed. A plurality of stacked laminations 11 make up the stator core 10. Stator core 10 has two diametrically opposed flat segments or portions 12 and 13. The structure of stator core 10 provides a small compact package without a substantial sacrifice in performance.

For convenience and simplicity of disclosure the same designations will be used hereinafter to identify components of the individual laminations and the corresponding stator core structure formed when the laminations are placed together in stacked relation. Each lamination includes winding turns receiving slots separated by teeth 14 which, when stacked in aligned relation, form the core now to be described.

The stator core 10 has three different slot sizes. The two smallest size slots 16 are located adjacent the central region of the flat segments 12 and 13. Three intermediate size slots 17 are located adjacent each slot 16. Four large size slots 18 are located adjacent to intermediate size slots 17. Each slot is separated by a tooth 14. This arrangement of slot sizes permits the location of mounting passageways 21 in the vicinity of the three intermediate size slots 17 without unduly restricting the flux carrying capacity of the stator core.

The size of slots 18 are controlled by the area needed to accommodate the primary winding turns for a given winding configuration or requirement. Aluminum is less expensive than copper and therefore from an economical viewpoint it is preferable to use aluminum. However one of the disadvantages of using aluminum wire is that it is necessary to use aluminum wire having larger cross-sectional area than copper wire in order to provide the same resistance per unit length of wire. Therefore, in order to use the less expensive wire, preferably slots 18 are made large enough to accommodate aluminum primary windings. Slots 16 are substantially smaller than slots 18 and preferably each have an area that is from thirty to fifty percent of the area of slot 18. The actual area of slot 16 relative to slot 18 is determined by the particular auxiliary winding configuration that is chosen for a given embodiment and by the amount of yoke area available for magnetic flux. For example, slots 16 for resistance-split phase motors with backlash auxiliary winding sections, each having an area on the order of fifty percent of the area of a slot 18 would accommodate most such windings; but for a resistance-split phase motor with an auxiliary winding with especially high current density each slot 16 would have an area on the order of thirty percent of the area of slot 18. Slots 17 preferably have an area that is from seventy-five to ninety percent of the area of a slot 18 and the exact size of a slot 17 is determined by a paraticular winding arrangement which is selected to provide predetermined desired performance characteristics for an electric motor utilizing such winding arrangement.

As shown, stator core 10 has four mounting passageways illustrated as mounting holes 21. However, with the inherent flexibility of this particular structure, three mounting or fastener passageways could be used. If it were desirable to use three mounting holes, then mounting hole 30 (shown in phantom) would be used and the two holes 21 nearest mounting hole 30 would be deleted. This particular flexibility of stator core 10 makes it more versatile in that it may be used in applications requiring four mounting holes or those which are restricted to three mounting holes.

In one reduction to practice, stator core 10 had a dimension A from flat segment 12 to flat segment 13 of 4.25 inches and a dimension B of 4.883 inches. In this embodiment, slots 16 had an area of 0.08276 square inches, slot 17 had an area of 0.14319 square inches, and slot 18 had an area of 0.16186 square inches. Flat segments 12 and 13 had a dimension C of 2.311 inches while dimension D was 4.901 inches. The stator core had a bore diameter E of 2.401 inches. The dimension F from the center of the bore to the center of the mounting passageways 21 was 2.297 inches.

Figure 2:
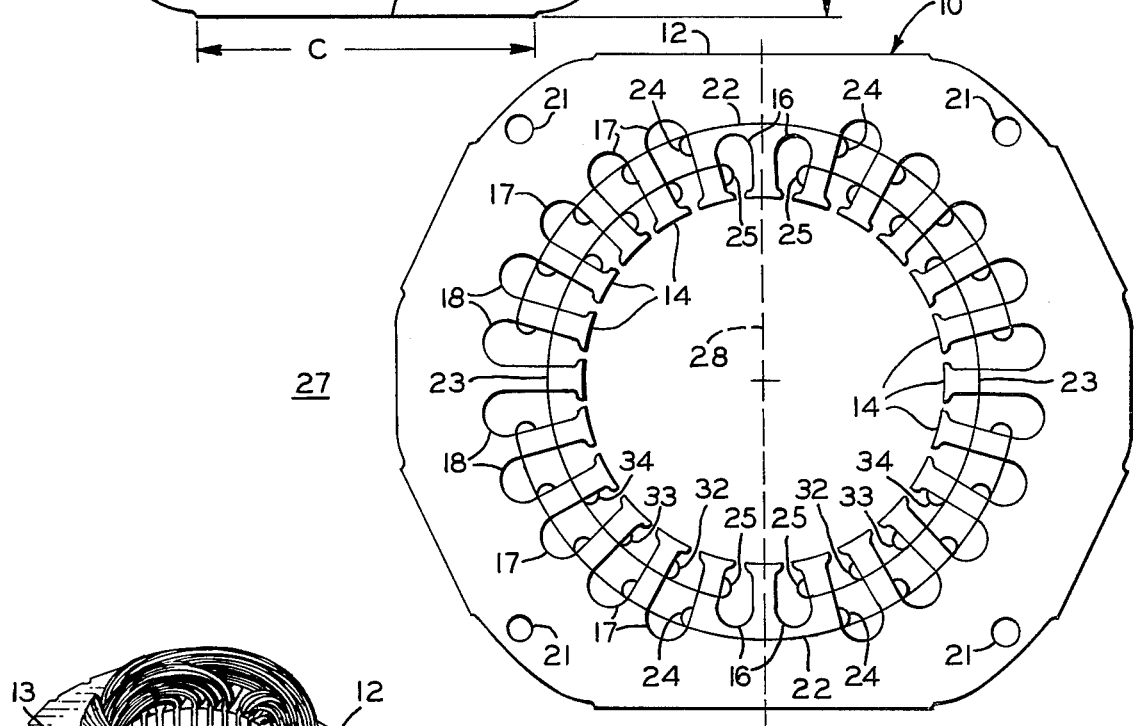
FIG. 2 is a plan view of a stator embodying my invention in one form and showing schematically the windings thereon.

As can be seen in FIG. 2, stator core assembly 27 includes primary winding 22 and auxiliary winding 23 positioned on stator core 10. Primary winding 22 consists of two coil groups of five concentric coils each. Each group of coils forms a magnetic pole. These magnetic poles define a magnetic polar axis 28 about which each of the primary winding coil groups is symmetrical. The sides of each of the three innermost coils of winding 22 each occupy one of the intermediate size slots 17 while the sides of each of the two outermost coils of winding 22 occupy one of the slots 18. It will be noted that the innermost coils 24 each span three core teeth that define the two small slots 16.

Auxiliary winding 23 has two coil groups each having four concentric coils. The outermost coil 25 of each coil group has one side in a slot 16 near flat section 13 and the other side in a slot 16 near flat section 12. The three inner coils 32, 33, 34 each share one of the slots 17 with winding turns of primary winding 22. Each coil group of auxiliary winding 23 forms an auxiliary magnetic pole.

Different auxiliary winding types have been used in the past to provide a desired starting characteristic for single phase induction motors. Depending on the particular requirements of a given application, a given motor may be particularly designed to operate in a resistance split-phase, permanent-split capacitor, or capacitor start mode. Moreover, different auxiliary winding schemes have been used for each auxiliary winding type. For example, resistance-split phase motors — some with high current density auxiliary windings, some with alloy wire auxiliary windings, and some with backlash auxiliary winding sections have been used in the past. Some of these approaches are described in more detail in U.S. Pat. No. 3,774,062 to John H. Johnson and in U.S. Pat. No. 3,663,057 to Chester A. Smith and William M. Stoddard both of which are hereby incorporated by reference. Different ones of these congenerous types of auxiliary windings and/or auxiliary winding schemes require different amounts of wire which means that some may require more slot space than others. In the past many stator cores were made to use one type of auxiliary winding configuration and could not be used for another. However, stator core 10 permits the utilization of any of the above congenerous types of auxiliary windings to be used with a single lamination design.

In one reduction to practice of a resistance-split phase motor, 0.0403 inch diameter aluminum wire was used for primary winding 22 wherein the innermost coil had 35 turns of wire and the next adjacent coil had 43 turns while the middle coil had 49 turns and both outer coils each had 64 turns of wire. The auxiliary winding 23 was wound from 0.0150 inch diameter copper wiring with both innermost coils each having nineteen turns and the next adjacent coil having 20 turns with the outermost coil 25 having 27 turns of wire. This configuration of auxiliary winding 23 provided a high current density auxiliary winding operation.

Slots 18 only accommodate aluminum wire and are larger than the other slots since the maximum number of turns of aluminum wire are in these slots. The aluminum wire for slots 17 is inserted first and may be compacted to allow space for the auxiliary winding turns. Slots 17 are sized to accommodate an aluminum wire primary winding plus winding turns for the auxiliary winding. Since slots 16 only accommodate winding turns of the auxiliary winding they can be smaller in size. By having slots 16 located adjacent flatted segments 12 and 13 the flux saturation in that portion of the yoke can be minimized since slots 16 are the smallest in size and therefore contain the least number of turns of wire.

In other auxiliary winding configurations requiring a greater amount of slot space, aluminum windings placed in intermediate slots 17 may also need to be compacted prior to insertion of the auxiliary winding. U.S. Pat. No. 3,515,919 to J. A. Houtman and assigned to the same assignee as the present application describes, inter alia, advantages of aluminum wire compaction and is hereby incorporated by reference.

Figure 4:
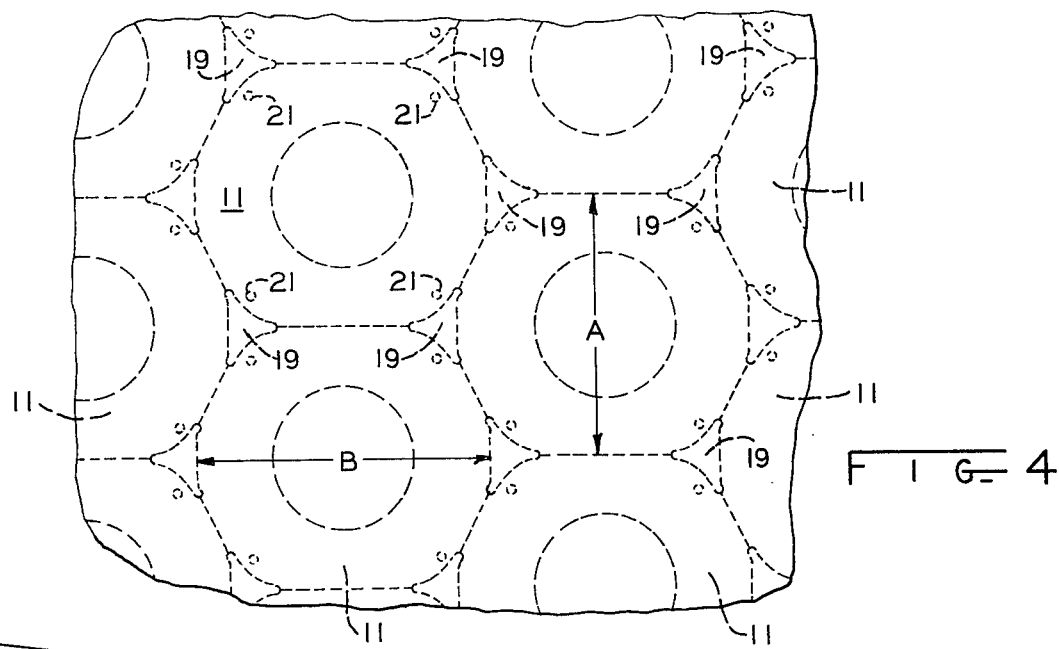
FIG. 4 is a plan view of laminations laid out on a strip of magnetic material in a nested arrangement.

FIG. 4 shows outlines in phantom of laminations 11 in a nested arrangement on a wide strip of magnetic material. The overall size of a lamination 11 is shown by the dimension B and A which are 4.883 inches and 4.25 inches, respectively when the laminations 11 are to be used to manufacture stator cores 10 that are to be of the particular size mentioned hereinabove. Note the relatively small amount of scrap 19 left over from between the outlines of lamination 11.

Figure 5:
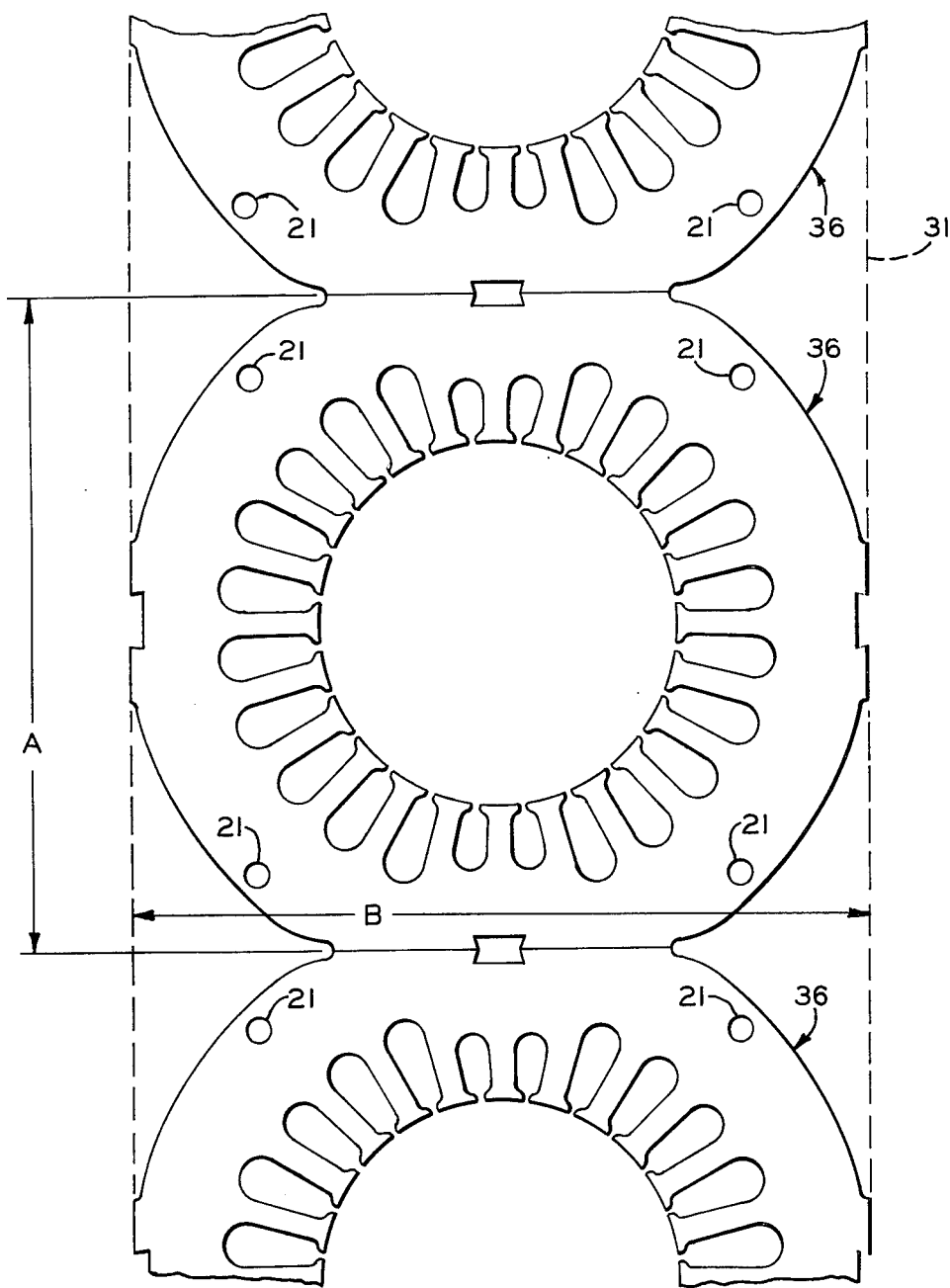
FIG. 5 is a plan view of laminations being punched from a strip of magnetic material.

FIG. 5 shows a strip of magnetic material in phantom from which laminations 36 can be punched and then used to make a core having substantially the same dimensions and performance characteristics as the core 10 of FIG. 1. When that particular core is dimensioned as spelled out previously herein, the width of strip material 31 as shown by dimension B will be 4.883 inches while dimension A (showing the width of laminations 36 from flatted segment to flatted segment) will be 4.25 inches. Of course it will be understood that a 4.25 inch wide strip of material could be used, but that then the laminations as shown in FIG. 5 would be reoriented ninety degrees relative to the strip of material.

It would be preferable to punch laminations 11 or 36 from a strip of material such that the flux lines near the flatted segments 12 and 13 are across the grain because lesser amounts of flux is carried in the vicinity of these flatted segments, and it is preferable to have the flux flow with the grain in regions of the yoke having larger flux densities. The major difference between laminations 11 and laminations 36 is in the outer peripheral configuration near mounting bolt holes 21. In FIG. 5 this configuration is in the form of an arc, while in a nested arrangement as illustrated in FIG. 4 the configuration is a straight line resulting from the abutting relationship of adjacent laminations.

When laminations, useful for making improved stator cores embodying my invention in one form, are punched from a single width strip of material as illustrated in FIG. 5 there is approximately 8.7 percent less gross steel used than when making a comparable performance stator core not embodying my invention and punched from a single width strip of material. Gross steel is the amount of strip material used from which the laminations are punched. An improved stator core embodying my invention has two percent less steel therein, by weight, than such comparable performance stator core, and there is less scrap left over from punching laminations for the improved stator core.

Figure 3:
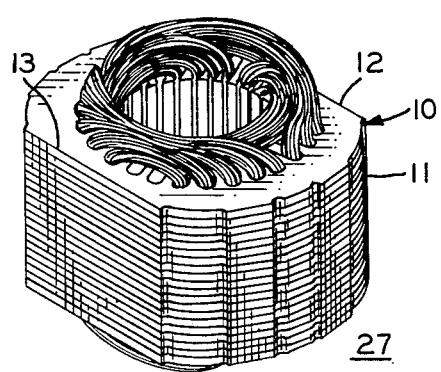
FIG. 3 illustrates, in perspective, a stator comprising a stator core and windings and embodying the invention in one form.

FIG. 3 shows stator assembly 27 having stator core 10 and with the ends of windings 22 and 23 extending therefrom. Stator core 10 includes a plurality of stacked laminations 11. An improved stator assembly embodying the invention and wound as described above was made and built into an improved motor and compared with a motor that used a comparable performance stator core, referred to hereinabove. Although both motors had cores of the same stack height (1.5 inches), the improved stator assembly had approximately two percent less steel in the core than the "comparable" core. Performance results are tabulated in Table I. It will be noted that performance of the improved motor is very competitive and yet uses less core material than the motor with a comparable performance core. The difference between the two motors is no more than that found among motors of the same production run.

TABLE I

|  | Improved Motor | Motor with Comparable Performance Core |
| --- | --- | --- |
| Max. Running Torque | 19.9 oz. ft. | 19.9 oz. ft. |
| Locked Rotor Torque | 9.0 oz. ft. | 8.9 oz. ft. |
| Full Load Amps | 3.618 | 3.602 |
| Full Load Watts | 267.5 | 265.9 |
| Full Load Efficiency | 71.0 | 71.4 |
| Full Load p.f. | 64.3 | 64.2 |
| Pounds of Auxiliary Wire | 0.124 | 0.124 |
| Pounds of Aluminum Wire | 0.671 | 0.671 |
| Full Load RPM | 3513 | 3514 |

A second improved stator assembly embodying the invention was made and built into a second improved motor and its performance was compared with another comparable motor that did not embody the invention. Both the second improved motor and comparable motor had the same stator core height (1.75 inches), but the improved stator had approximately two percent less steel in its stator core.

Table II is a tabulation of performance results obtained when the just described second improved motor and comparable motor were tested.

TABLE II

|  | Second Improved Motor | Motor With Comparable Performance Core |
| --- | --- | --- |
| Max. Running Torque | 29.2 oz. ft. | 29.1 oz. ft. |
| Locked Rotor Torque | 11.0 oz. ft. | 11.0 oz. ft. |
| Full Load Amps | 4.018 | 4.149 |
| Full Load Watts | 267.5 | 268.3 |
| Full Load Efficiency | 71.4 | 71.2 |
| Full Load p.f. | 57.9 | 56.2 |
| Pounds of Auxiliary Wire | 0.112 | 0.112 |
| Pounds of Aluminum Wire | 0.813 | 0.813 |
| Full Load RPM | 3538 | 3540 |

After reviewing the above tabulation of performance results, it will be appreciated that even though the second improved stator uses less steel, and results in less lamination punching scrap even better performance is obtained vis-a-vis the comparable motor.

Figure 6:
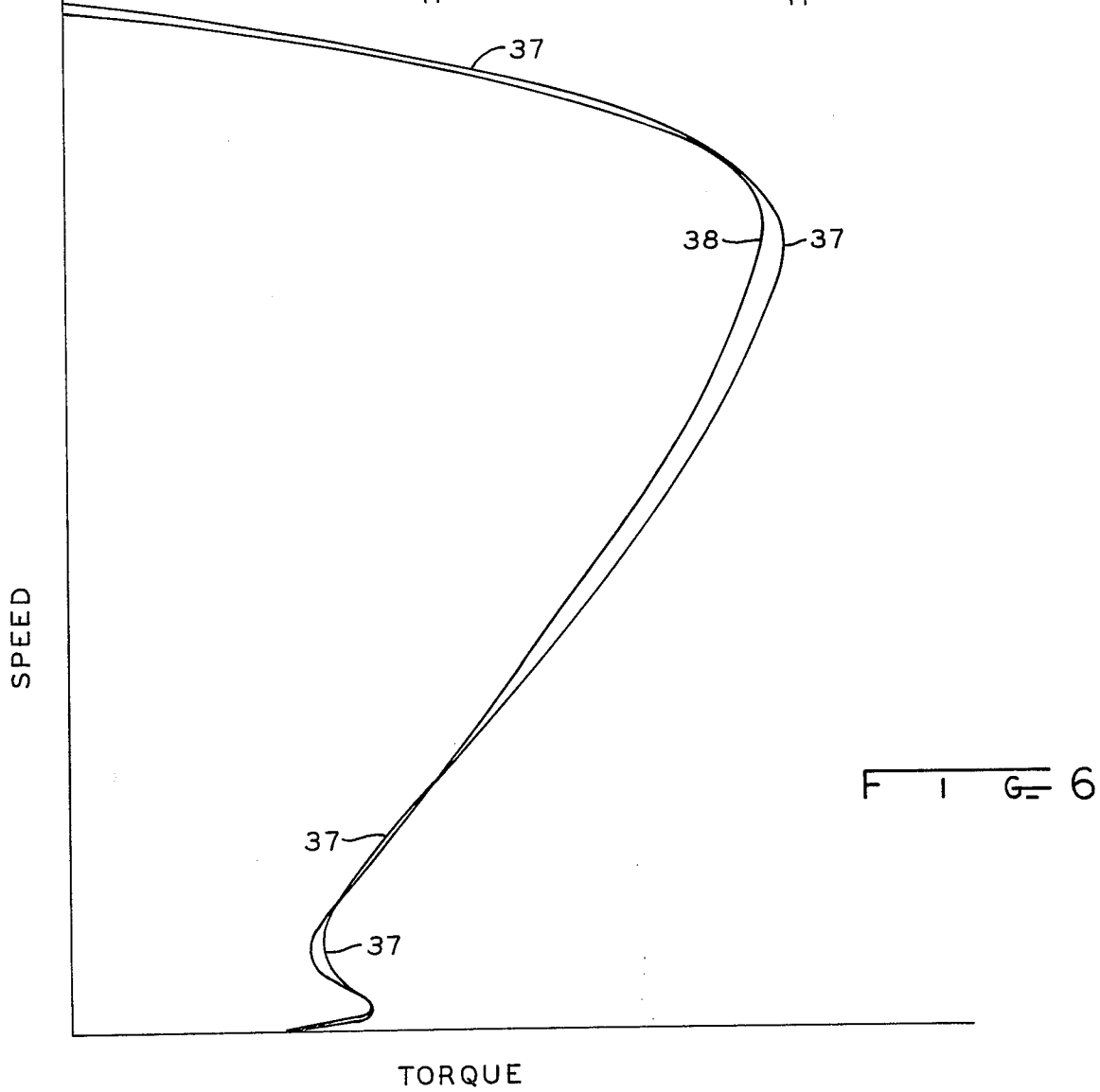
FIG. 6 shows torque-speed curves for a motor embodying the invention and for a comparable motor.

A plot of speed in revolutions-per-minute (RPM) versus torque in ounce-feet is shown in FIG. 6 for the two motors compared in Table II above. Curve 37 represents data for the second improved stator assembly embodying the present invention while curve 38 represents data for the comparable motor. It is evident from a comparison of the curves and data that electric motors embodying my invention are comparable in performance to the other tested motors and yet require less raw material to manufacture.

Figure 7:
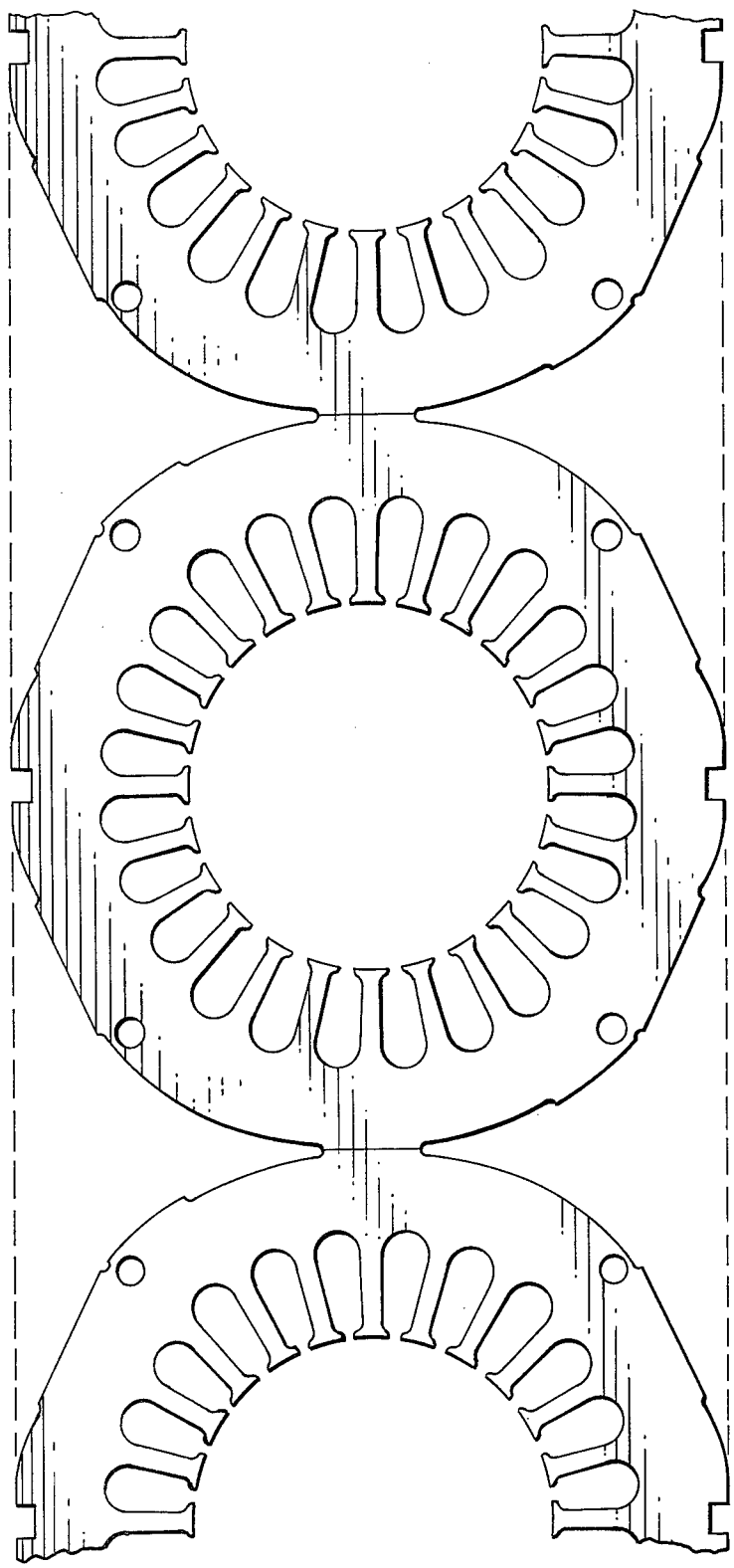
FIG. 7 is a plan view of laminations being punched from a single width strip of magnetic material and which do not embody the present invention.
Figure 8:
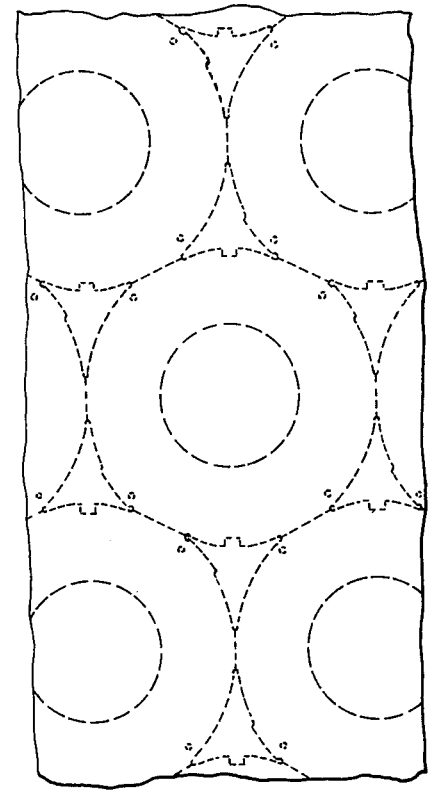
FIG. 8 is a layout for laminations on a multiple width strip of magnetic material and shown in a nested arrangement and which do not embody the present invention.

FIGS. 7 and 8 illustrate laminations arrangements on a single width strip of material and on a multiple width strip of material respectively. The laminations illustrated are ones used in making the stator cores for the comparable motor of Table II; and these laminations have been commercially used more than a year prior to this application and thus are "prior art". Somewhat similar prior art laminations, (but having 24 uniformly sized slots) were used to make the comparable motor of Table I.

A stator core made from laminations punched as illustrated in FIG. 5 will use approximately 8.7 percent less gross steel than one punched from laminations as illustrated in FIG. 7; while a stator core made from laminations as illustrated in FIG. 4 will use approximately 5.1 percent less gross steel than one punched from laminations as illustrated in FIG. 8. It is therefore evident that not only are stator cores embodying my invention more versatile but they also require less raw material and yet provide comparable performance.

While in accordance with the Patent Statutes, I have described what at present is considered to be the preferred embodiments of my invention, it will be obvious to those skilled in the art that numerous changes and modifications may be made therein without departing from the invention and it is therefore aimed in the appended claims to cover all such equivalent variations which fall within the true spirit and scope of the invention.

What I claim as new and desire to secure by Letters Patent of the United States is:

1. A stator for a dynamoelectric machine comprising: a plurality of laminations each having a plurality of angularly spaced apart, coil accommodating slots; a first distributed phase winding arranged in a plurality of said slots and including at least two coil groups defining at least two predetermined primary magnetic poles; and a second distributed phase winding defining at least two auxiliary magnetic poles angularly displaced from the primary magnetic poles; the at least two predetermined magnetic poles having a polar axis; each first distributed phase winding coil group being symmetrical about the polar axis; the first slot each side of the axis established by the first phase winding being of a first predetermined area; three slots next adjacent each first slot being of a second predetermined area, and two slots of a third predetermined area next adjacent to the slots of the second predetermined area; the slots of a third predetermined area being larger than the slots of a second predetermined area, and the slots of a second predetermined area being larger than the slots of a first predetermined area thereby to permit the effective utilization of congenerous types of auxiliary windings in a given stator core structure.

2. A stator lamination for a dynamoelectric machine comprising: a piece of magnetic material having an outer peripheral portion and an inner peripheral portion defining a cylindrical bore; said lamination having an outer peripheral yoke portion and having a plurality of teeth extending from the yoke portion toward the bore; the teeth defining spaced apart winding turn receiving slots therebetween and the slots being of predetermined areas; the lamination having at least two diametrically opposed flat segments along the outer peripheral portion thereof; said plurality of teeth defining a plurality of slots disposed symmetrically about a line passing through the flat segments and the center of the bore; said teeth being arranged to define a pattern of slots having areas of different sizes; a first slot on either side of the line being of a first predetermined size, a group of three slots each of a second predetermined size adjacent each such first slot, and a group of two slots each of a third predetermined size next adjacent each group of three slots; the third predetermined size being larger than the second predetermined size, and the second predetermined size being larger than the first predetermined size; said yoke portion having at least two fastener accommodating passageways formed therein with each of the at least two passageways located in a region of the yoke adjacent to slots of a second predetermined size so that the fastener accommodating passageways can be provided in the yoke portion without unduly restricting the flux carrying capacity of the lamination.

3. A stator assembly for a dynamoelectric machine, a magnetic stator core having a plurality of winding slots formed therein each having a closed end; at least two diametrically opposed flat segments located on an outer periphery of the stator core; a primary winding comprising at least two primary poles having a primary polar axis, each primary winding pole comprising a plurality of coils each having sides occupying a different pair of the slots; and an auxiliary winding comprising at least two auxiliary poles having an auxiliary polar axis angularly displaced from the primary polar axis, the auxiliary winding comprising winding turns disposed in slots of the core; the primary polar axis bisecting the diametrically opposed flat segments; a first slot on either side of and adjacent to the primary polar axis being of a first size, three slots next adjacent each first slot being of a second size and two slots adjacent the three slots being of a third size; the third size being larger than the second size and the second size being larger than the first size; the first slots being of a size to permit accommodation of backlash auxiliary winding turns without unduly restricting a region of the stator core adjacent the first slots whereby turns of congenerous types of auxiliary windings may be effectively utilized with a single stator slot structure.

4. The stator assembly of claim 3 wherein the primary winding includes five concentric coils and the auxiliary winding includes four concentric coils; an innermost coil of the primary winding spanning the two slots of a first size; and the outermost coil of the auxiliary winding occupying one of the slots of the first size adjacent each flat segment.

5. The stator assembly of claim 4 wherein the primary winding comprises aluminum wire and the auxiliary winding comprises copper wire.

6. The stator assembly of claim 5 wherein each of said five concentric coils are identified by the number n where n is equal to one for the innermost coil, and two through five respectively for the other of said five coils preceeding from innermost to outermost respectively, and wherein each of said five coils span a number of slots equal to 2n; and wherein each of said four concentric coils are identified by the number one for the innermost coil, and two through four respectively for the other of said four coils preceeding from innermost to outermost respectively, and wherein coil one spans four slots, coil two spans six slots, coil three spans eight slots, and coil four spans ten slots.

7. A dynamoelectric machine stator having a core formed of magnetic material, said core comprising a yoke section, a bore disposed radially inwardly of such yoke section and a plurality of angularly spaced apart elongated winding receiving slots extending toward the bore; the core having at least two longitudinally extending passageways disposed radially outwardly of the slots at a predetermined distance from the center of the bore; the core having at least two diametrically opposed flat portions on an outer portion of the core; a primary winding comprising at least two primary poles having at least one primary polar axis, each primary winding pole comprising a plurality of coils each having sides occupying a different pair of the slots; an auxiliary winding comprising at least two auxiliary poles having at least one auxiliary polar axis angularly displaced from the at least one primary polar axis; the at least one primary polar axis passing through the diametrically opposed flat portions; and the slots forming a preselected pattern of slot sizes symmetrical about the at least one primary polar axis with a first slot nearest the at least one primary polar axis being of a first size, three slots next adjacent each first slot being of a second size; two slots next adjacent the three slots being of a third size, and wherein the third size is larger than the second size, and the second size is larger than the first size; so that flux carrying capacity of the stator core in the vicinity of the at least two passageways is greater than it would be were the slots of a second size to be equal in size to the slots of a third size and whereby two different passageway patterns may be used.

* * * * *